July 31, 1962
E. LORETAN
3,047,346
SHOCK-ABSORBING BEARING FOR THE MOVABLE
ELEMENT OF A SMALL MECHANISM
Filed April 24, 1961
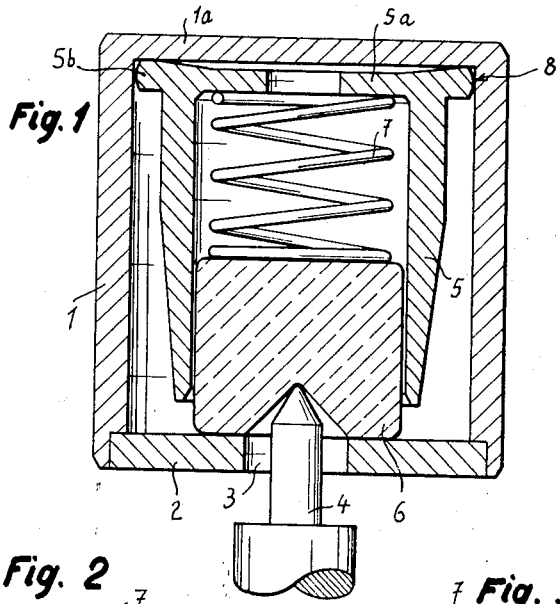
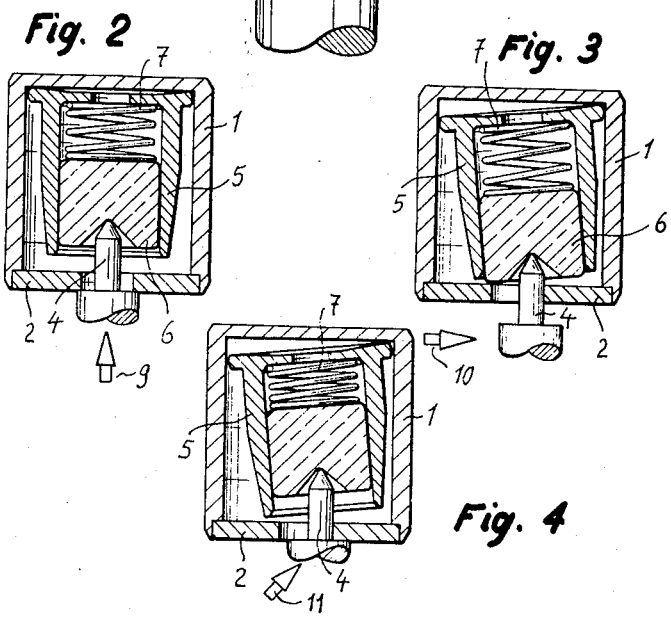
INVENTOR
EDOUARD LORETAN
BY
ATTORNEY

United States Patent Office 3,047,346
Patented July 31, 1962

3,047,346
SHOCK-ABSORBING BEARING FOR THE MOVABLE ELEMENT OF A SMALL MECHANISM
Edouard Loretan, Le Sentier, Switzerland, assignor to Parechoc S.A., Le Sentier, Switzerland, a firm of Switzerland
Filed Apr. 24, 1961, Ser. No. 105,027
Claims priority, application Switzerland May 6, 1960
2 Claims. (Cl. 308—159)

This invention relates to a shock-absorbing bearing, for the movable element of a small mechanism such as a watch embodying a step-bearing and which comprises a bearing support in an internal cavity of which a mount for the step-bearing is housed in such manner as to be radially displaceable, the said step-bearing being in turn housed in the said mount in such manner as to be able to move axially therein and being subjected to the action of a resilient returning device which also acts on the said mount, at least indirectly.

The bearing of the invention is characterised in that the front end of the mount is open so as to permit the free movement or passage of the step-bearing, the resilient element housed in the said mount behind the step-bearing being interposed between the latter and an inner shoulder provided at the other end of the mount in such manner that the said resilient element tends to cause the step-bearing to leave its mount, thus applying these two elements respectively to two opposite surfaces of the bearing support, so as to effect centering of the step-bearing.

The drawing illustrates one embodiment of the subject of the invention by way of example.

FIGURE 1 is an axial section of a shock-absorbing bearing and,

FIGURES 2, 3 and 4 are axial sections of the same bearing on a smaller scale showing the movements of the movable elements of the bearing as a result of the various shocks that the shaft may be subjected to.

The bearing illustrated comprises a support 1, in the form of a cylindrical case, which is intended to be driven into the frame (not shown) of the device on which the bearing is mounted. Said support is formed by a driven-in cover or cap 2 having a hole 3 for the passage of the shaft pivot 4.

The support 1 encloses a bush 5 which is housed in the support with radial clearance and inside which a step-bearing 6 can slide axially. The front end of the bush 5 is open and permits the free passage or movement therethrough of the step-bearing.

A coil spring 7 is housed in the bush 5 behind the step-bearing 6. Said spring bears at one end on the step-bearing and at the other end against the end 5a of the bush 5. This spring tends therefore to urge the step-bearing against the cap 2 and the bush 5 against the wall 1a of the support 1 opposite the cap 2.

At its end 5a the bush 5 has an outer flange or shoulder 5b, the circumferential surface 8 of which is a segment of a sphere, which serves to guide the bush when it rocks inside the support 1 and which serves to centre it in the support when it is in a level position, as shown in FIGURE 1, which is the position of rest of the bearing.

When the shaft undergoes a shock, the step-bearing 6 can slide axially in the bush 5, which forms its mount, and the said bush can rock in the bearing support 1. Thus when the shaft undergoes a purely axial shock in the direction of the arrow 9 in FIGURE 2, for example, the bush 5 does not move and the step-bearing 6 slides inside the bush; it is returned to its rest position by the spring 7. When the shaft undergoes a purely radial shock, for example in the direction of the arrow 10 in FIGURE 3, the bush 5 rocks in the support 1, the step-bearing performing only a very slight axial movement in the bush. The return to the central rest position is produced by the spring 7. Finally, when the shocks experienced by the shaft are both radial and axial, as is most frequently the case, for example in the direction of the arrow 11 in FIGURE 4, the two movements described above are combined.

What I claim is:

1. In a shock-absorbing bearing for a movable element of a small mechanism, a bearing support, a tubular mount movably mounted in the said support, the rear end of which is provided with an inner shoulder, a step-bearing mounted in the said mount so as to be axially movable therein, the front end of the said mount being open so as to permit the free passage of the said step-bearing, and a resilient element housed in the said mount, behind the said step-bearing, interposed between the latter and the said inner shoulder, whereby the said resilient element acts axially on the said step-bearing and on the said mount to apply them respectively to two opposite surfaces of the bearing support.

2. In a shock-absorbing bearing for a movable element of a small mechanism, a bearing support, a tubular mount movably mounted in the said support, the rear end of which is provided with an inner shoulder, a bush mounted in the said mount so as to be axially movable therein, the front end of the said mount being open so as to permit the free passage of the said bush, and a coil spring housed in the said mount, behind the said bush, interposed between the latter and the said inner shoulder, whereby the said coil spring acts axially on the said bush and on the said mount to apply them respectively to two opposite surfaces of the bearing support.

References Cited in the file of this patent

FOREIGN PATENTS

| | | |
|---|---|---|
| 800,464 | Great Britain | Aug. 27, 1958 |
| 1,229,518 | France | Mar. 21, 1960 |